United States Patent [19]

Buser et al.

[11] 4,361,911

[45] Nov. 30, 1982

[54] LASER RETROREFLECTOR SYSTEM FOR IDENTIFICATION OF FRIEND OR FOE

[75] Inventors: Rudolph G. Buser, Wall, N.J.; Robert S. Rohde, Springfield; Neal T. Nomiyama, Herdon, both of Va.

[73] Assignee: The United States of American as represented by the Secretary of the Army, Washington, D.C.

[21] Appl. No.: 266,025

[22] Filed: May 21, 1981

[51] Int. Cl.³ ............................................. H04B 9/00
[52] U.S. Cl. ...................................... 455/605; 455/604
[58] Field of Search ..................... 455/604, 605, 606; 343/6.5 R, 6.5 SS, 6.8 R

[56] References Cited

U.S. PATENT DOCUMENTS

| | | | |
|---|---|---|---|
| 3,813,553 | 5/1974 | Grossman | 455/604 |
| 3,989,942 | 11/1976 | Waddoups | 455/605 |
| 4,081,669 | 3/1978 | Klingman | 455/604 |
| 4,096,380 | 6/1978 | Eichweber | 455/605 |
| 4,099,050 | 7/1978 | Sauermann | 455/604 |
| 4,131,791 | 12/1978 | Lego | 455/604 |
| 4,134,008 | 1/1979 | de Corlieu | 455/604 |
| 4,249,265 | 2/1981 | Coester | 455/605 |

*Primary Examiner*—Howard Britton

*Attorney, Agent, or Firm*—Nathan Edelberg; Milton W. Lee; Max L. Harwell

[57] ABSTRACT

A high power laser interrogator with a dedicated receiver transmits a first pulse having a cryptic interrogation meassage therein which is detected by a suitable detector in a retroreceiver aboard a friendly target. At a predetermined time later, a second laser pulse, which is unmodulated, is transmitted to the friendly target. The friendly target has a laser retroreflector receiver/transponder with a modulating device therein which the cryptic interrogation message can only be decoded by a friendly target wherein the retroreflector reflects laser light only when the correct preselected cryptic interrogation message in the first pulse is detected and only during the duration of the unmodulated second pulse. The leading edge of the second pulse is detected and initates the modulation of the modulating device which allows the second pulse to pass therethrough with a preassigned intensity modulation as determined by the transponder. As intensity modulation occurs the pulse is reflected by the retroflector back through the modulator to the dedicated receiver in the laser interrogator, and if the modulation code is the same as preassigned, the target is deemed friendly but if not the target is determined to be an enemy.

21 Claims, 10 Drawing Figures

LASER RETROREFLECTOR SYSTEM FOR IDENTIFICATION OF FRIEND OR FOE

The invention described herein may be manufactured, used, or licensed by the U.S. Government for governmental purposes without the payment of any royalties thereon.

BACKGROUND OF THE INVENTION

1. Field of the Invention

The present invention is a covert laser retroreflector system of gating open a coded laser retroreflector in an interrogated friendly target by a laser interrogator having a dedicated receiver therein in which specifically coded radiation transmitted from the interrogator triggers the retroreflector to reflect back another coded signal to the dedicated receiver to identify the target as being friendly.

2. Description of the Prior Art

At the present time there is no known wide field-of-view (FOV) laser retroreflector which can be interrogated successfully and yet remain covert. Prior systems require a laser interrogator and a return signal from the target at some other wavelength, such as millimeter or microwave return. These systems require extra antennas which are omni-directional and whose radiation can be detected by opposing sides. Another approach includes a laser signal return, but necessitates that the on-board laser would fire a second return after some delay. Two lasers, one for the interrogator and another for the transponder would require a more complex laser system.

A laser interrogator presents no technical problem in the system of the present invention. The purpose of the present invention is to provide a covert laser retroreflector system with a wide FOV for cooperative battlefield identification of frield-or-foe (CBIFF). The problem is to provide a means of modulating a retroreflector such that the retroreflector is operational, i.e. reflecting, only when desired, yet is non-operational if illuminated by an enemy laser beam. The problem is solved by gating open a retroreflector at a specific time for a short time interval and modulating the laser pulse radiation in the form of a preassigned code. By controlling the transmission of the retroflector in this manner, the retroreflector may be undetectable and unuseable by non-friendly forces, such as enemy laser designators or laser homing missiles.

Various target mounted receivers, or reply links, for laser interrogators have been considered. Some of these reply links that have been considered are as follows. One reply link uses a longitudinally excited Stark Cell modulator retroreflector for use at carbon dioxide ($CO_2$) laser wavelengths of 10.78 $\mu$m. The Stark modulator provides a 25% depth of modulation which is unacceptable for CBIFF operation. Further, its operational lifetime of only two weeks is insufficient for this application. Another consideration is a mechanical shutter retroreflector in which controlled modulation of a retroreflector can be obtained by placing a mechanical shutter in front of the retroreflector. A large FOV is possible with the mechanical shutter approach but has insufficient bandwidth for the CBIFF application.

Another system approach involves a two-way laser system in which the reply signal is provided with a second laser on the friendly target with its laser beam modulated. This approach has a more complicated design since a second laser is required, and the direction of the laser interrogator must be detected by the receiver on the target before responding to the interrogation so that the target laser may be pointed in the correct direction. Another system that is somewhat complicated involves a reply signal to the laser interrogator that uses a millimeter wave/microwave transponder on the friendly target. This approach requires transmitting antennas that are omni-directional and therefore can be detected by non-friendly forces by proper design of their receivers.

SUMMARY OF THE INVENTION

The present invention is a laser retroreflector system for CBIFF target identification which has sufficient modulation bandwidths to perform the CBIFF function, a wide FOV, sufficient depth of modulation, is difficult to detect by non-friendly forces, and eliminates the need for a second laser link and the corresponding complexities associated therewith. The system is comprised of a high power laser interrogator with a dedicated wide aperture receiver for first transmitting a cryptic interrogation message in a first pulse followed in a short time by an unmodulated laser pulse toward a friendly target and for receiving a return coded message. The friendly target, in turn, has a laser retroreflector receiver/transponder having a modulating retroreflector controlled by a decoder/encoder. The retroreflector is alerted by encoded cryptic interrogation message and modulates the modulating retroreflector only during the time of reception of the unmodulated second laser pulse and only after a correct interrogation signal from the interrogator is received and detected by a detecting means in the retroreflector. The retroreflector retroreflects a return modulated reply signal with the correct preassigned code back to a dedicated receiver in the interrogator. Only a friendly target, having a retroreflector thereon, will respond in the preassigned code. Otherwise, the target can be assumed to be an enemy. It should be noted that both the interrogator and retroreflector have clocks therein that are synchronized with each other to provide a more secure retroreflector system.

The transmitter portion of the interrogator may be a (1) $CO_2$ TEA laser, a (2) chopped continuous wave (CW) $CO_2$ laser, a (3) Q-switched cavity dumped $CO_2$ laser, a (4) Q-switched Nd:YAG laser, a (5) single longitudinal mode Nd:YAG laser, or any other high power laser that is appropriate. All of the lasers will however have an electro-optic modulator to encode the cryptic interrogation message on the first laser pulse, herein called pulse 1. Typical detectors in the detecting means of the retroreflector that are compatible with the above laser transmitters may be a cooled HgCdTe detector for 10.6 $\mu$m detector or a silicon detector for 1.06 $\mu$m detection. The modulating device, or modulating retroreflector, may be (1) an acoustooptic modulator in front of a reflecting mirror, (2) parallel array Pockels Cells in front of a reflecting mirror, or a (3) parallel array of transversely excited Stark Cell in front of a reflecting mirror. All of these modulating retroreflectors are positioned along the optical axis of collecting optics, which is preferably comprised of a collecting lens which focuses the radiation onto a fiber optics bundle. The fiber optics bundle is used to straighten out the laser light rays for the higher deflection efficiencies in the modulating device. It should be noted that the laser light signal remains polarized in traveling through the fiber optics bundle. The detector, or detectors, of the detecting means are positioned at the focal point of a detector lens to receive pulses one and two from the interrogator. The output signal of each detector goes directly to the decoder/encoder. The decoder/encoder preferably has a microprocessor therein that has the corrected preselected cryptic interrogation message built therein for proper detection and decoding and has a preprogrammed code that modulates the modulating device during the time of the reception of the unmodulated second pulse so that the modulating device retroreflects the correct preassigned code as a modulated reply signal back to the interrogator.

The laser retroreflector system may operate at multiple wavelengths wherein the interrogator has a wavelength discriminator, such as a prism or grating, for selectively choosing different wavelengths for the first and second pulses and the retroreflector likewise has wavelength discriminators therein for detecting and decoding the preassigned code of different wavelengths to properly modulate the modulating device. Multiple wavelength operation of the laser retroreflector system reduces the effects of atmospheric scintillation.

The embodiments of the present invention will be better understood by the following detailed description with reference to the following Figure drawings.

DETAILED DESCRIPTION OF THE EMBODIMENTS

Figure 1A:
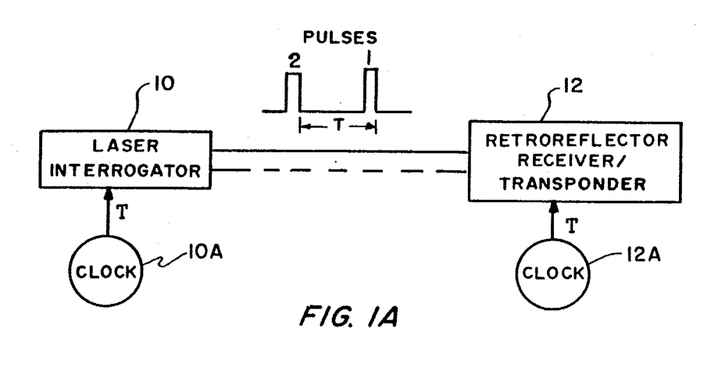
FIG. 1A illustrates in block diagram the interrogation link of the CBIFF laser retroreflector system.
Figures 1B, 1C:
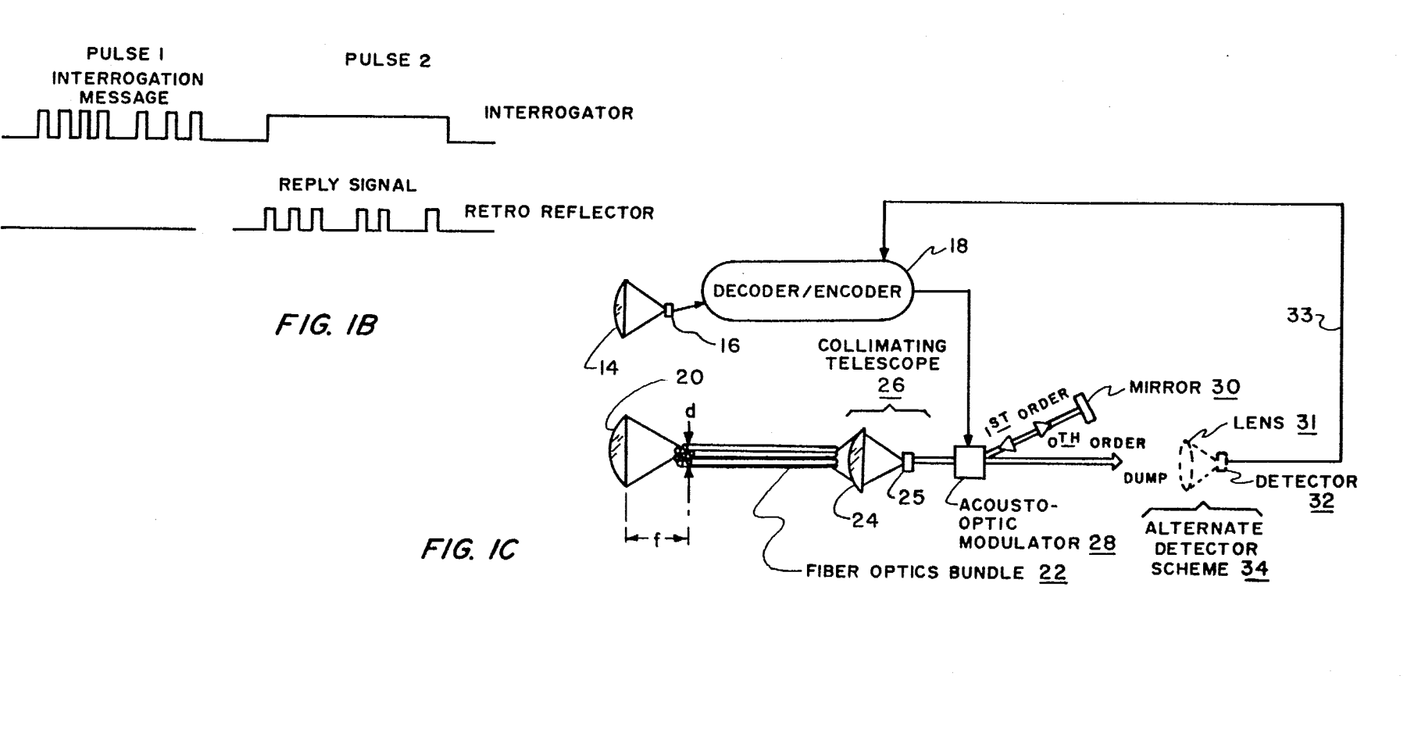
FIG 1B illustrates both the interrogator and the retroreflector receiver/transponder interrogation messages and reply pulses respectively in an expanded time scale.
FIG. 1C shows a schematic of the retroreflector system using an acoustooptic modulator.

FIG. 1A illustrates the overall laser retroreflector system in which pulses 1 and 2 are shown transmitted from the laser interrogator 10 toward the retroreflector receiver/transponder 12. Pulse 2 follows pulse 1 by a very short time, represented as T, which is a predetermined time and is clocked into 10 and 12 respectively by interrogator clock 10A and retroreflector clock 12A. FIG. 1B illustrates on an expanded time base from right to left the interrogation message across the top and the retroreflector reply signal from left to right across the bottom. Note that during the time of the interrogation pulse 1 the retroreflector does not produce a pulse but during that time is only alerted thereby to be ready to modulate the unmodulated pulse 2 when interrogation pulse 2 arrives. During the duration of the unmodulated interrogation pulse 2 the retroreflector receiver/transponder produces a reply signal pulse 2 that is intensity modulated according to a preassigned code built into the decoder/encoder in the retroreflector 12. The coded reply signal is retroreflected back to the dedicated receiver in the interrogator 10 to verify that the target on which 12 is mounted is a friendly target.

FIG. 1C shows one embodiment of a retroreflector receiver/transponder 12. The interrogator pulses 1 and 2 are received in detector lens 14 and detecting means 16, with detecting means 16 at the focal point of detector lens 14. A collecting optics is comprised of collecting lens 20, fiber optics bundle 22, and colliminating telescope 26, which includes converging lens 24 and diverging lens 25. Interrogator 10 laser pulses 1 and 2 enter lens 20 and are transferred on to fiber optics bundle 22, which has its input positioned at the focal point of lens 20, designated as f, and its output positioned close to the converging lens 24 of the collimating telescope 26 through which interrogator pulses 1 and 2 pass to an acoustooptic modulator 28. The acoustooptic modulator 28 is preferably made of Germanium. The output of a detector in the detector means 16 is applied to a decoder/encoder 18 which in turn modulates the acoustooptic modulator 28 in accordance with a preprogrammed code built therein. Pulse 1 from the interrogator has the cryptic interrogation message therein that alerts the encoder/decoder 18 that an unmodulated pulse 2 will arrive in a short time T, as clocked by clocks 10A and 12A. The rising edge of unmodulated pulse 2 is used to trigger modulation of the unmodulated pulse 2 in the acoustooptic modulator 28 by the decoder/encoder 18 preprogrammed code. Decoder/encoder 18 preferably has a microprocessor therein in which the preprogrammed code is built. It should be noted that modulator 28 is open during the passage of the cryptic interrogation message first pulse and is therefore dumped. Pulse 2 is modulated by modulator 28 in accordance with the preprogrammed code. When the modulator is in the "off" state or open, the laser beam straight through and is dumped but when the modulator is in the "on" state the laser beam is deflected toward mirror 30. A modulated reply signal is encoded by the encoder/decoder 18 of the retroreflector 12, is transmitted back out the collecting optics to the interrogator transmitter-receiver 10, and is detected and decoded by the receiver portion of the interrogator. The preprogrammed code is known by 10. It can easily be seen that only friendly targets with the preprogrammed modulated retroreflector therein will modulate a reply signal with the correct modulated code.

The retroreflector 12 has a wide FOV detector lens 14 matching the acceptance angle of the retroreflector modulator collecting lens 20. For the second optical train the laser energy is collected by collecting lens 20 and focuses the radiation onto a fiber optics bundle 22. The FOV for the device is determinted by the diameter of the bundle represented by d, and the focal length of the lens, f: $FOV = 2\tan^{-1}(d/2f)$. The fiber optics bundle 22 is used to straighten out the light rays for higher deflection efficiencies for the modulator 28. The ends of the individual fibers may be founded to reduce the beam spread upon exiting the fiber. The acoustooptic modulator 28 is oriented such that the beam entering the cell is a Bragg's angle. In the "off" state of the modulator, the beam passes straight through the cell and is dumped. The "on" state the modulator deflects the beam according to the Bragg Angle Equation, $$2\lambda_2 \sin o = m\lambda/n$$

where $\lambda_2$ is the sound wavelength $= v_s/\nu_s$
$v_s$ is the sound velocity in the AO cell
$\nu_s$ is the acoustic frequency
$\theta$ is the Bragg Angle inside the AO cell
$\lambda$ is the laser wavelength
n is the index of reflection for the AO cell at a given $\lambda$, and
m is the diffraction order.

We can set m = 1 for the 1st order case. The deflected beam is reflected back by mirror 30 through the modulator cell 28 and exits along the optical axis of the second optical train. The beam is coupled by the collimating telescope 26 into the fiber bundle 22 and is re-transmitted back through the collecting lens 20 to the receiver portion of the interrogator 10. By turning the AO modulator 28 on and off, pulses can be impressed upon the original light pulse from the interrogator thereby producing a coded signal to be retroreceived by the interrogator 10. Similarly, by modulating the amplitude of the acoustic signal, amplitude modulation can be achieved and by modulating the frequency about the center frequency of $\nu_s$, frequency modulation can be obtained.

Deflection efficiency is controlled by the amplitude of the acoustic signal applied to the AO modulator cell 28. As an example, for 10.6 $\mu$m radiation modulation, the power required in the decoder/encoder 18 to deflect a 6 mm diameter beam by a Germanium (Ge) AO modulator with efficiencies approaching 90% is approximately 170-200 watts of RF power. In the pulse burst mode where the duty cycle is low, considerably less average RF power would be needed. The reflected beam will have a beam spread limited to the mechanical FOV of the collecting lens 20 and fiber optic bundle 22 diameter.

The response time of the AO modulator 28 is determined by the speed of sound in the AO material and the beam size passing through the crystal. For example, a 10.6 $\mu$m system might use a 6 mm aperture AO modulator fabricated from Germanium (Ge). The speed of sound in Ge is 5500 m/sec, or a response time of 1.1 usec is obtained. The frequency response can therefore be calculated as 320 kHz; i.e. a frequency, f = 0.35/1.1 usec. A 2 mm aperture would yield a frequency response of 960 kHz.

A variation to the above approach is to have the lens 31 and detector 32, in an alternate detector scheme 34, behind the AO modulator 28 monitoring the 0th order beam. This variation will increase the correlation of the detected energy and the reflected energy since their FOV's are identical because the atmospheric turbulence can spatially decorrelate the wavefront of the laser beam directly along the second optical train. In this embodiment the first pulse goes directly through modulator 28 and detector 32 feeds the cryptic interrogation message first pulse to decoder/encoder 18 by lead 33 to alert 18 to the unmodulated pulse 2 that is to immediately follow. Operation of the retroreflector when pulse 2 arrives is the same as previously explained.

Figure 2A:
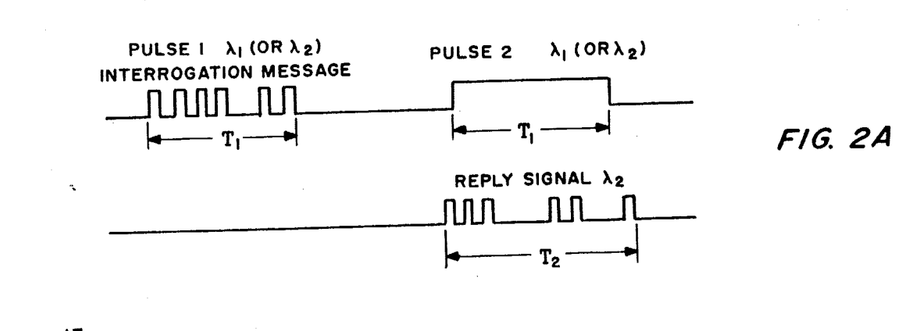
FIG 2A illustrates multiwavelength interrogation and reply pulses on a time scale.
Figure 2B:
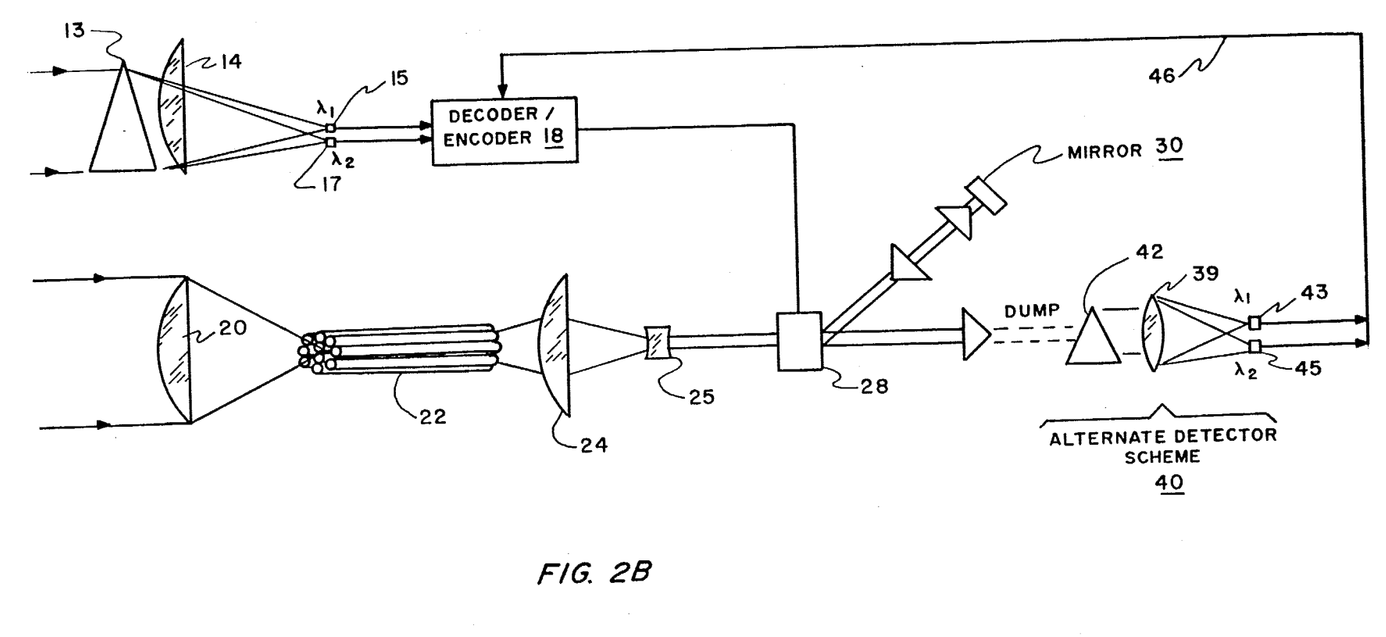
FIG. 2B is a like embodiment of FIG. 1C that operates in the multiwavelength mode.

Refer now to FIGS. 2A and 2B for an illustration wherein multiwavelengths, namely two wavelengths represented by $\lambda_1$ and $\lambda_2$, are used in the interrogation and reply pulses. FIG. 2A is similar to FIG. 1B but in this instance shows the combinations. This embodiment is a variation of the first embodiment but is more secure because four possible combinations of two different wavelengths can be used for the cryptic interrogation message and the modulated reply signal. The cryptic interrogation message in the first pulse informs the retroreflector receiver/transponder 12 which wavelength the second pulse will be. The interrogator 10 is free to interrogate with either of the two wavelengths because the receiver transponder 12 is also capable of detecting either of two wavelengths by use of a waveform discriminator 13 and two detectors 15 and 17. The waveform discriminator 13 may be a prism or grating place in front of the lens 14 is used to separate the two wavelengths, represented as $\lambda_1$ and $\lambda_2$. The two detectors 15 and 17 respectively detect laser radiation at $\lambda_1$ and $\lambda_2$. As in the embodiment of FIG. 1C, the detection FOV is sufficient to match the FOV of the modulator.

The first pulse transmission, either $\lambda_1$ or $\lambda_2$, informs the retroreflector receiver/transponder 12 what the wavelength of the second pulse will be. If the second pulse is not the correct wavelength as determined by the detector selection scheme, modulator 28 will not modulate and no modulated reply signal is reflected back to the interrogator 10. An alternate detector scheme 40 similar to that in the embodiment discussed with reference to FIG. 1C may also be made here. A waveform discriminator, lens, and two detector combination represented repsectively by 42, 39, and 43 and 45 may be set up to monitor the zeroth order beam from the AO modulator cell 28, thus eliminating the detectors 15 and 17 up front which may or may not be correlated to the radar light rays being modulated by the AO modulator 28. Outputs from detectors 43 and 45 are applied to decoder/encoder 18 by lead lines 44 and 46 respectively for alerting 18 similar to as explained herein above.

However, it may also prove feasible to allow for multiple wavelength operation to reduce the effects of atmospheric scintillation. Multiple wavelenths, $\lambda_1$, $\lambda_2$ . . . . . $\lambda_m$ could be similtaneously transmitted such that incoherent addition of the different wavefronts for each $\lambda$ would reduce the fluctuation of intensity across the receiver plane. The modulated return would also become multiple wavelengths allowing for reduction fo atmospheric scintillation at the interrogator's receiver plane. Implementation would require the placement of a detector for each different wavelength being detected and reflected by the retroreflector.

Figure 3:
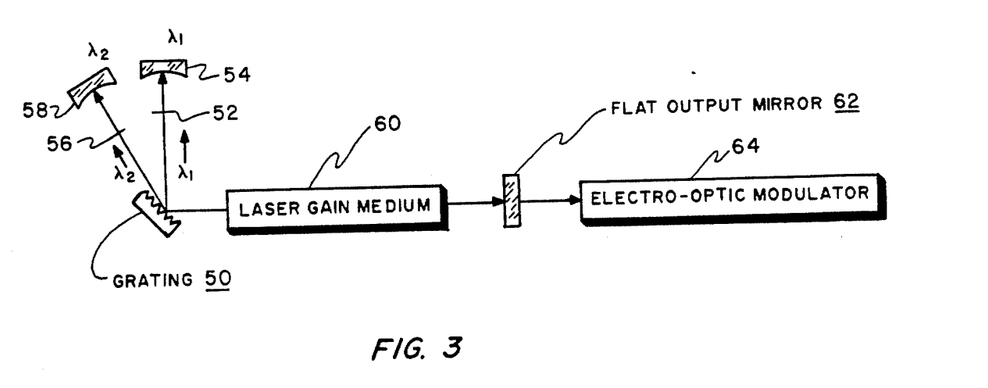
FIG. 3 illustrates wavelength discrimination for multiwavelength interrogation in the laser interrogator.

A method for generating multiple wavelengths in a laser gain medium 60, such as interrogator 10, is illustrated in FIG. 3 where a diffraction grating 50 and concave reflective mirrors 54 and 58 are used to select wavelengths, $\lambda_1$ and $\lambda_2$ respectively. For single wavelength operation, the wavelength selected is allowed to lase by opening one of the mechanical shutters 52 or 56. For multiple wavelength operation, shutters 52 and 56 are removed. At $CO_2$ wavelengths, parallel laser cavities may be needed to operate multiline. The output of the selectable multiple wavelength laser 60 is coupled through a flat output mirror 62. For modulation, any EO modulator 65 with the proper transmission may be used.

Figure 4A:
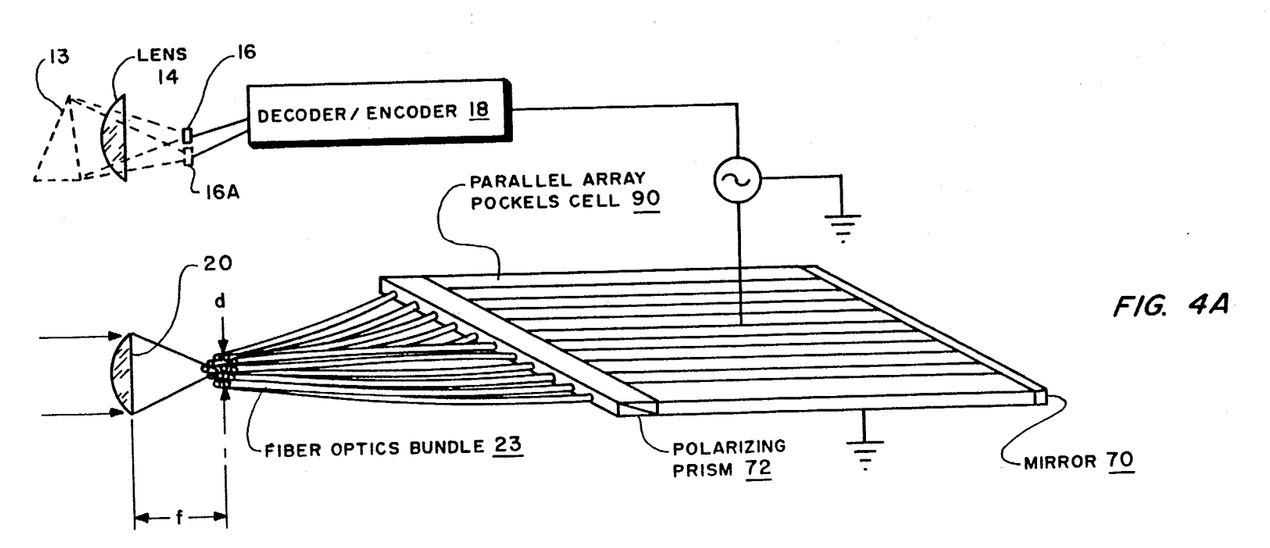
FIG. 4A illustrates a schematic of the retroreflector system using Pockels Cell modulator.
Figure 4B:
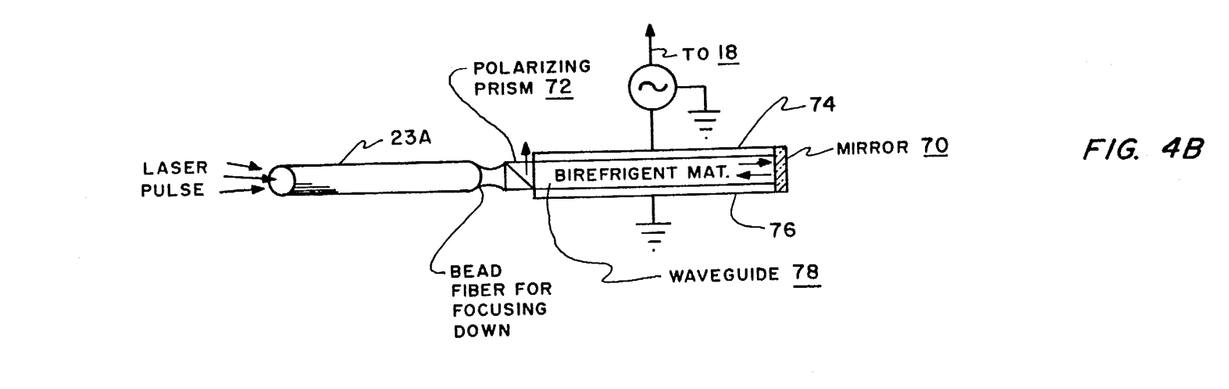
FIG. 4B shows a side view of FIG. 4A.

FIGS. 4A and 4B illustrates another embodiment of the retroreflector receives/transponder 12 using a Pockels Cell as the modulator. The previous approaches using acoustooptic modulators are limited to low bandwidths. If the $CO_2$ TEA laser interrogator approach is used, faster response times are required for the modulated retroreflector receiver/transponder 12, i.e. modulation of the tail of the $CO_2$ TEA laser may require up to 50 MHz bandwidth. Pockels Cell modulators are capable of operating up to and beyond 50 MHz. The approach is also sensitive to angle because the Pockels Cell is based on polarization effects. However, by using fiber optic bundles 23 the angle sensitivity is resolved.

The collecting lens 20 focuses the laser energy onto a particular fiber 23A for a given angle of arrival. Each of the fibers are connected to a polarizing prism 72. Only vertically polarized light passes through prism 72. The parallel array Pockels Cell 90, preferably made of Cadmium Telluride (CdTe) birefrigent material for $CO_2$ wavelength, having the dimensions of a waveguide, designated as 78 to reduce overall voltage requirements to drive it, is DC biased by the quarter wave voltage on the upper plate 74. Lower plate 76 is electrically grounded. The laser beam passes through the Pockels Cell and is reflected off mirror 70 back therethrough. Top plate 74 may be sputter gold or silver while lower plate 76 may be made of brass. Having passed through the Pockels Cell twice, the beam is horizontally polarized, forcing the beam to exit perpendicular to the optical axis. By superimposing a negative quarter wave peak signal from the decoder/encoder 18 on upper plate 74, the voltage is driven to zero and the light becomes vertically polarized again and passes back through the polarizing prism 72. The light re-enters the optical fiber 23 and to the focal plane of the collecting lens 20 and is returned to the interrogator 10. The superimposed negative quarter wave peak signal modulates the unmodulated second laser pulse in accordance with the preassigned code. Because the same fiber is used for the given angle of arrival, the return wavefront is parallel to the original wavefront tilt detected. The FOV for the modulated retroreflector is limited by the diameter of the fiber optic bundle represented by d and the focal length of the collecting lens, represented by f. For large FOV applications, the collecting lens 20 will need to be corrected for abberations in its focal plane.

If horizontally polarized light enters the FOV of the collecting lens 20, the polarizing prism 72 will not permit the light to enter the Pockels Cell 90 therefore no light is reflected back to the interrogator. If elliptically polarized or unpolarized light is received by the collecting lens 20, the polarizing prism 72 will defect all light that is not vertically polarized from the optical axis. Vertically polarized light will be rotated by the double pass Pockels Cell 90 and upon intercepting the polarizing prism 72 will be deflected from the optical axis as well. No light will be reflected back to the interrogator.

A multiple wavelength detection variation of this approach is to use a dispersive element 13, such as a grating or prism, in front of the detector lens 14 which would allow two or more detectors 16 and 16A to selectively detect the pre-selected wavelength. As state herein above, the purpose of using such a dispersive element is to make a more secure interrogation link where only a single wavelength can be detected.

Figure 5A:
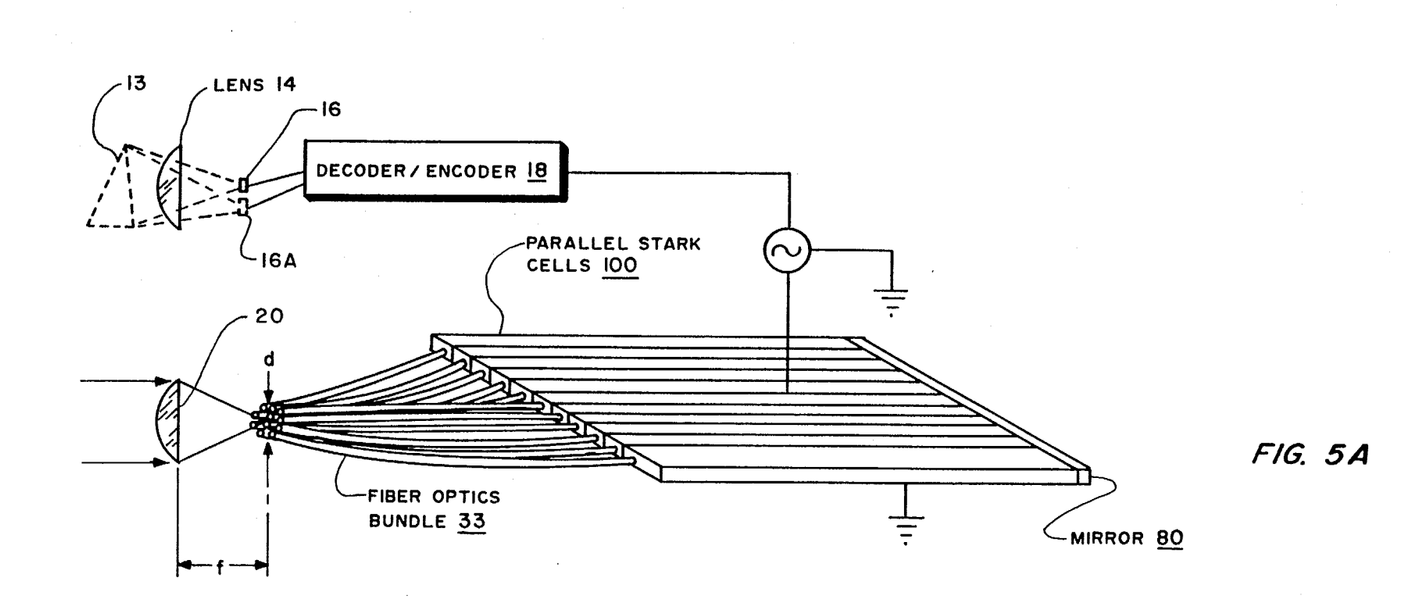
FIG 5A illustrates a schematic of the retroreflector system using Stark Cell modulator.
Figure 5B:
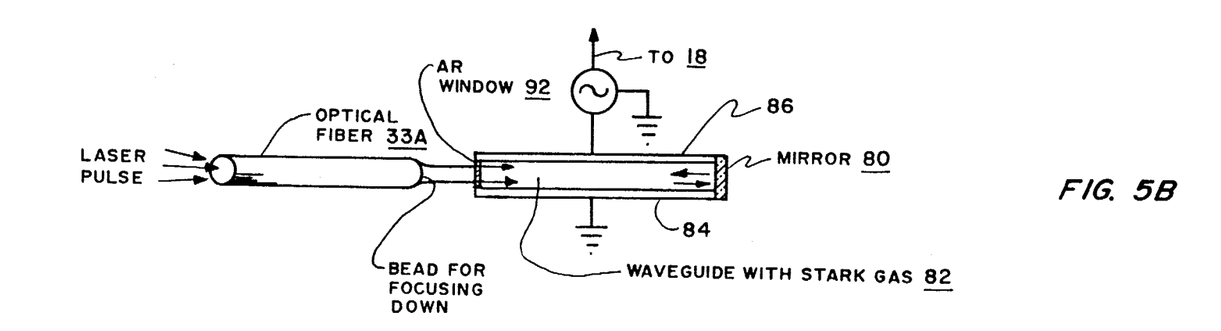
FIG. 5B shows a side view of FIG. 5A.

Refer to FIGS. 5A and 5B where the modulator is comprised of Stark Cell modulators in the transverse excitation operation used to modulate the retroreflector. The Stark Cell embodiment is similar to that of the Pockels Cell embodiment except that the polarizing prism is not used. The parallel Stark Cells 100 are made up of two electrodes, represented as upper plate 86 and lower plate 84, an antireflection coated window 92 and a mirror 80 forming a waveguide filled with a molecular gas represented by 82, that exhibits the Stark-Effect. The molecular gas used at $CO_2$ laser wavelengths may be methyl chloride vinyl chloride, methyl bromide, 1, 1 defluoroethylene, 1, 1 difluoroethane, or ammonia ($NH_3$). A DC bias voltage slightly off Stark resonance is applied to upper plate 86. For modulation, a signal requiring a few hundred volts peak is also applied to upper plate 86 from a RF power source in decoder/encoder 18. The advantage gained using a Stark Cell modulator is the lower power requirement for wide-band modulation and optical uniformity. To achieve high extinction ratios for pulse code modulation, however, may require longer Stark Cells than that of the Pockels Cell. Window 92 may be made of Zinc-Selenide, Germanium, or Gallium arsenide. Upper plate 86 may be sputtered gold or silver. Lower plate 84 may be made of brass.

The multiple wavelength detection variation as used in other embodiments may also be used with the Stark Cell modulator embodiment.

We claim:

1. A covert laser retroreflector system for cooperative battlefield friend-or-foe target identification, said system comprising:
a laser interrogator with clocked transmitter and dedicated large aperture receiver portions therein wherein said transmitter portion transmits an encoded cryptic interrogation message on a first laser pulse toward a target followed by a precisely timed clocked unmodulated second laser pulse and wherein said receiver portion receives a retroreflected reply signal from a friendly target; and
a laser retroreflector receiver/transponder positioned on said friendly target for receiving said first and second laser pulses therein clocked in synchronism with said clocked transmitter and receiver portions in said interrogator, said laser retroreflector receiver/transponder comprised of detector lens and a detecting means for detecting said first and second laser pulses and a decoder/encoder for decoding the detected encoded cryptic interrogation message first laser pulse and the detected unmodulated second laser pulse and collecting optics comprised of a collecting lens and fiber optics bundle with its input at the focal point of the collecting lens and a collimating telescope comprised of converging lens at the fiber optics bundle output and diverging lens for collecting said first and second laser pulses and a modulating retroreflector positioned on the optical axis of said collecting optics for receiving said first and second laser pulses from said diverging lens wherein said modulating retroreflector is in the off state until modulated in the on state by a signal processor in said decoder/encoder wherein said modulating retroreflector is modulated only during the time that said unmodulated second laser pulse is received and only when a correctly encoded cryptic interrogation message in said first laser pulse is detected by said detecting means and is decoded by said decoder/encoder for activating the signal processor in said decoder/encoder clocked in synchronism with said unmodulated second laser pulse wherein said modulating retroreflector modulates the unmodulated second laser pulse in near real time to produce a retroreflected modulated reply signal with the proper preassigned code therein which is encoded by said decoder/encoder and is retroreflected back along the optical axis of said collecting optics to said dedicated receiver of said laser interrogator which is optically aligned with said modulated reply signal for decoding therein to determine friend-or-foe target identification.

2. A system as set forth in claim 1 wherein said first and second laser pulses and said modulated reply signal operate in multiwavelengths for reducing the effects of atmospheric scintillation and to keep said laser retroreflector system more secure.

3. A system as set forth in claim 2 wherein said laser interrogator has a laser gain medium with a diffraction grating and a plurality of concave reflective mirrors at one end thereof for selecting different wavelenghts and at the output end of said laser gain medium a flat output mirror and an electrooptic modulator for encoding said first and second laser pulses at selected wavelengths and wherein said laser retroreflector receiver/transponder has a wavelength discriminator positioned in front of said detector lens to separate the different wavelengths and a plurality of detectors in said detecting means for detecting said encoded cryptic interrogation message first laser pulse and said unmodulated second laser pulse at the different wavelengths wherein the wavelength of said first laser pulse decoded by said decoder/encoder informs said retroreflector receiver/transponder what the selected wavelength of said unmodulated second laser pulse will be so that the signal processor of said decoder/encoder only responds to an unmodulated second laser pulse of the selected wavelength.

4. A system as set forth in claim 3 wherein said different wavelengths are determined by the number of said plurality of concave reflective mirrors and said plurality of detectors in two.

5. A system as set forth in claims 1 or 3 wherein said modulating retroreflector is comprised of an acoustooptic modulator in the optical axis of said collecting optics with a laser beam energy dump along said optical axis past said acoustooptic modulator and a reflecting mirror offset from said optical axis by the first order bend of the laser beam wherein modulation of said acoustooptic modulator during the time of said unmodulated second laser pulse produces said retroreflected modulated reply signal.

6. A system as set forth in claim 1 wherein said modulating retroreflector is comprised of an acoustooptic modulator on the optical axis of said collecting optics in which said detector lens is eliminated and said detecting means is axially collinear and past said modulating retroreflector and a reflecting mirror offset from said optical axis by the first order bend of the laser beam wherein said encoded cryptic interrogation message of said first laser pulse and said unmodulated second laser pulse enter said detecting means along said optical axis of said collecting optics and are detected thereby wherein said decoder/encoder decodes the detected first and second laser pulses and said signal processor in said decoder/encoder modulates said modulating retroreflector only during the time that said unmodulated second laser pulse is received to produce said retroreflected modulated reply signal.

7. A system as set forth in claim 3 wherein said modulating retroreflector is comprised of an acoustooptic modulator on an optical axis of said collecting optics in which said detector lens is eliminated and said detecting means is axially collinear and past said modulating retroreflector wherein said wavelength discriminator is positioned in front of said detecting means to separate the different wavelengths and a plurality of detectors in said detecting means for detecting said first and second laser pulses at the different wavelengths wherein the wavelength of said first laser pulse decoded by said decoder/encoder informs said retroreflector receiver/transponder what the selected wavelength of said unmodulated second laser pulse will be so that the signal processor of said decoder/encoder only responds to an unmodulated second laser pulse of the selected wavelength to produce said retroreflected modulated reply signal.

8. A system as set forth in claim 1 wherein the transmitter portion of said laser interrogator is a modulated $CO_2$ TEA laser.

9. A system as set forth in claim 1 wherein the transmitter portion of said laser interrogator is a chopped CW $CO_2$ laser.

10. A system as set forth in claim 1 wherein said transmitter portion of said laser interrogator is a Q-switched cavity dumped $CO_2$ laser.

11. A system as set forth in claim 1 wherein said transmitter portion of said laser interrogator is a Q-switched Nd:YAG laser.

12. A system as set forth in claim 1 wherein said transmitter portion of said laser interrogator is a single longitudinal mode Nd:YAG laser.

13. A system as set forth in claim 1 wherein said detecting means are cooled Mercury-Cadmium-Telluride detectors.

14. A system as set forth in claim 1 wherein said detecting means are cooled Silicon detectors.

15. A system as set forth in claim 6 or 7 wherein said acoustooptic modulator is made of Germanium.

16. A system as set forth in claims 1 or 3 wherein said modulating retroreflector is comprised of a parallel array Pockels Cell having a polarizing prism only allowing vertically polarized laser energy therethrough at the input end thereto and a reflecting mirror on the other end thereof wherein said collecting optics is comprised of a collecting lens and fiber optics bundle wherein each fiber optic of said fiber optics budnle is butting into one prism of said polarizing prism with the fiber optics bundle input being at the focal point of said collecting lens wherein each fiber optic receives focused laser energy from slaid collecting lens at a given angle of arrival to resolve angular sensitivity of the polarization effect of said Pockels Cell, said parallel array Pockels Cell having the dimensions of a waveguide with an upper plate and a lower plate to reduce overall voltage requirements to drive said modulating retroreflector wherein said lower plate is electrically grounded and said upper plate is connected to said decoder/encoder and is constantly DC biased by the quarter wave voltage of the Pockels Cell birefrigent material wherein the vertically polarized laser energy of said first and second laser pulses pass through said polarizing prism and said Pockels Cell and is reflected off said reflecting mirror back through said Pockels Cell as horizontally polarized laser beams which are deflected by said polarizing prism in which said decoder/encoder decodes said detected encoded cryptic interrogation message of said first laser pulse and said unmodulated second laser pulse wherein said signal processor in said decoder/encoder modulates said parallel array Pockels Cell during the transient of said unmodulated second laser pulse therethrough whereby a negative quarter wave peak signal is applied to said upper plate which balances said DC biased upper plate to zero to cause the double passed horizontally polarized unmodulated second laser pulse to become vertically polarized and pass back through said polarizing prism as a selectively coded modulated reply signal exiting through said fiber optics bundle and said collecting lens at the same angle of exit as said given angle of arrival back to said dedicated receiver of said interrogator.

17. A system as set forth in claims 1 or 3 wherein said modulating retroreflector is comprised of parallel Stark Cells operating in transverse excitation mode having an antireflection coated window at the input end thereto and a reflecting mirror on the other end thereof wherein collecting optics is comprised of a collecting lens and a fiber optics bundle wherein the output end of said fiber optic bundle is butted into said antireflection coated window and the input end is at the focal point of said collecting lens wherein said collecting lens and said fiber optics bundle transmit said first and second laser pulses therethrough to said parallel Stark Cells, said parallel Stark Cells having the dimensions of a waveguide with an upper plate and a lower plate enclosing a molecular gas which exhibits the Stark-effect between said window and said reflecting mirror wherein said lower plate is electrically grounded and said upper plate is connected to said decoder/encoder and has a DC bias voltage slightly off Stark resonance applied thereto wherein laser energy of said first and second laser pulses pass through said window and is reflected off said reflecting mirror back through said molecular gas in which said decoder/encoder decodes said detected encoded cryptic interrogation message of said first laser pulse and said unmodulated second laser pulse wherein said signal processor in said decoder/encoder modulates said parallel Stark Cells with a radio frequency power source applied to said upper plate during transient of said unmodulated second laser pulse therethrough to produce a selectively coded modulated reply signal which exits through said collecting optics back to said dedicated receiver of said interrogator.

18. A system as set forth in claim 16 wherein said birefrigent material is Cadmium-Telluride.

19. A system as set forth in claim 17 wherein said molecular gas is methyl chloride and said laser transmitter in said interrogator is of $CO_2$ laser wavelengths.

20. A system as set forth in claim 17 wherein said molecular gas is vinyl chloride and said laser transmitter in said interrogator is of $CO_2$ laser wavelengths.

21. A system as set forth in claim 17 wherein said molecular gas is ammonia and said laser transmitter in said interrogator is of $CO_2$ laser wavelength.

* * * * *